(12) United States Patent
Wang et al.

(10) Patent No.: US 11,368,103 B2
(45) Date of Patent: Jun. 21, 2022

(54) HYBRID-CURRENT-MODE SWITCHING-CYCLE CONTROL

(71) Applicant: Virginia Tech Intellectual Properties, Inc., Blacksburg, VA (US)

(72) Inventors: Jun Wang, Arlington, VA (US);
Rolando Burgos, Blacksburg, VA (US);
Dushan Boroyevich, Blacksburg, VA (US)

(73) Assignee: VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 65 days.

(21) Appl. No.: 15/931,795

(22) Filed: May 14, 2020

(65) Prior Publication Data

US 2020/0373851 A1 Nov. 26, 2020

Related U.S. Application Data (60) Provisional application No. 62/850,330, filed on May 20, 2019.

(51) Int. Cl.
*H02M 7/483* (2007.01)
*H02M 1/08* (2006.01)

(52) U.S. Cl.
CPC ............. *H02M 7/483* (2013.01); *H02M 1/08* (2013.01); *H02M 7/4835* (2021.05)

(58) Field of Classification Search
CPC ...... H02M 7/483; H02M 1/08; H02M 7/4835; H02M 1/0003; H02M 1/15
See application file for complete search history.

(56) References Cited

U.S. PATENT DOCUMENTS

| | | | |
|---|---|---|---|
| 9,966,874 B2 | 5/2018 | Wang et al. | |
| 10,637,343 B2* | 4/2020 | Fujii | H02M 7/48 |
| 11,063,530 B2* | 7/2021 | Jeong | H02M 7/483 |
| 11,070,124 B2* | 7/2021 | Ishida | H02M 7/797 |
| 2014/0146586 A1* | 5/2014 | Das | H02M 1/36 363/49 |
| 2018/0159422 A1* | 6/2018 | Kikuchi | H02M 7/12 |
| 2019/0199096 A1* | 6/2019 | Kish | H02M 3/155 |
| 2019/0267898 A1* | 8/2019 | Elserougi | H02M 7/4835 |
| 2020/0177099 A1* | 6/2020 | Slepchenkov | H02M 7/53871 |
| 2020/0201953 A1* | 6/2020 | Shi | G06F 30/367 |
| 2021/0111629 A1* | 4/2021 | Gray | H02M 1/15 |

\* cited by examiner

*Primary Examiner* — Kyle J Moody
(74) *Attorney, Agent, or Firm* — Thomas Horstemeyer, LLP (57) ABSTRACT

Aspects of hybrid-current-mode switching-cycle control are described. In one embodiment, a peak current mode is selected to control a switching power cell. The switching power cell is in an arm of a phase leg of a modular multilevel converter. The phase leg includes an upper arm and a lower arm, and the switching power cell includes a capacitor and at least one switch. At least one switch control signal switches the switching power cell according to a peak current mode based on at least one arm current boundary crossing identified for the arm.

20 Claims, 6 Drawing Sheets

HYBRID-CURRENT-MODE SWITCHING-CYCLE CONTROL

CROSS-REFERENCE TO RELATED APPLICATIONS

This application claims the benefit of U.S. Provisional Application No. 62/850,330, filed May 20, 2019, the entire contents of which are hereby incorporated herein by reference.

BACKGROUND

A modular multilevel converter (MMC) is a transformerless power converter suitable for use in high-voltage or medium-voltage power conversion applications. MMCs include a cascade connection of multiple switching power cells each having a power-storing capacitor that floats in the cascade connection. Thus, in the control of an MMC, it is necessary to individually voltage-balance and control floating capacitors in the switching power cells. The switching power cells can be constructed using various configurations of switching power transistors, such as half bridge and full bridge topologies, among others. To control the output of an MMC, the switching power transistors can be controlled using switching control signals generated by a controller.

A significant amount of research has been conducted to mitigate various problems with MMC control, including the reduction of voltage ripple on the capacitors in the switching power cells. Some methods are relatively unsuitable for high voltage, high power applications, however, for various reasons. For example, some methods are unsuitable for relatively large arm currents because of high power device losses.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Modular Multilevel Converters (MMCs) can be used in power converter systems to convert direct current (DC) into alternating current (AC), for example, without a transformer and are becoming attractive solutions for high voltage, high power applications, among others. Transformerless unidirectional or bidirectional AC-DC interface power converter systems have been proposed, for example, to connect DC nanogrids to AC utility grids. Compared with isolated topologies, the non-isolated topology of transformerless AC-DC interface power converter systems is relatively simpler and generally more efficient.

One of the challenges of using an MMC for these applications can be to minimize capacitor voltage ripple in the switching power cells of the MMC. A conventional approach of using a large capacitance in the switching power cells can increase the volume and cost of MMCs. However, switching-cycle control (SCC) techniques can significantly reduce the size and weight of passive components. The present disclosure describes a new hybrid-current-mode (HCM) SCC of an MMC. The HCM SCC control technique can involve both peak current mode and average current mode. The concepts described herein can be used to significantly reduce capacitor voltage ripple in switching power cells of an MMC used in power converter systems.

Some aspects involve a power converter system that includes a direct current (DC) power system, an alternating current (AC) power system, and a modular multilevel converter configured for hybrid-current-mode switching-cycle control. The modular multilevel converter includes a phase leg comprising an upper arm with an upper switching power cell, and a lower arm comprising a lower switching power cell. The switching power cells can include a capacitor and at least one switch to switch the capacitor. An upper controller generates switch control signals for switching the upper switching power cell according to a modulation mode selected between average current mode and peak current mode. A lower controller generates switch control signals for switching the lower switching power cell according to another modulation mode selected between the average current mode and the peak current mode. The modulation of each arm can be different, such that one uses average current mode and the other uses peak current mode.

Further aspects can involve a method for switching-cycle control of a modular multilevel converter. The method includes selecting a peak current mode to control a switching power cell of an arm of a phase leg of the modular multilevel converter. The phase leg includes an upper arm and a lower arm. The switching power cell includes a capacitor and at least one switch. The method also includes generating at least one switch control signal that switches the switching power cell according to a peak current mode based on at least one arm current boundary crossing identified for the arm. A controller or controller circuit can select the peak current mode and generate the switch control signal.

Additional aspects can involve a modular multilevel converter that includes a phase leg comprising an upper arm and a lower arm, and a controller that generates at least one switch control signal. A respective arm can include an arm inductor and at least one switching power cell. A respective switching power cell can include a capacitor and at least one switch that switches a switching power cell. The switch control signal can control the switching of the at least one switch of an arm of the phase leg. The switch control signal can be generated according to a peak current mode based on at least one arm current boundary crossing identified for the arm.

Figure 1:
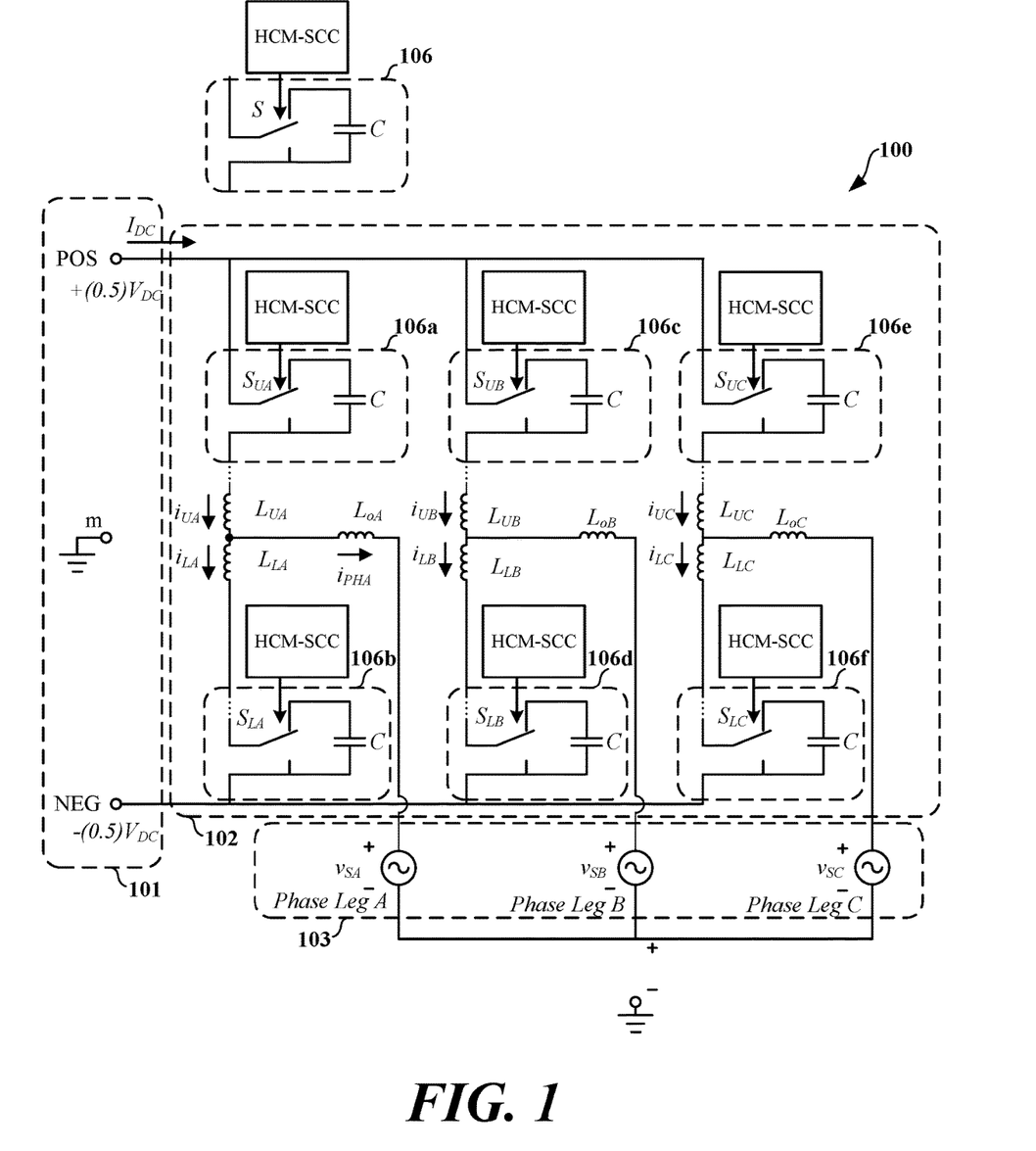
FIG. 1 illustrates a system including a direct current (DC) grid or power system, a modular multilevel converter (MMC), and an alternating current (AC) grid or power system according to various examples described herein.

Turning to the drawings, FIG. 1 illustrates a power converter system 100 including a DC power grid or system 101, an MMC 102, and an AC power grid or system 103. The MMC 102 provides a solution for high voltage, high power conversion applications, but can be applicable to other types of power conversion applications. The MMC 102 includes a number of phase legs corresponding to the number of phases of the AC power grid 103. In this case, the MMC 102 includes three phase legs corresponding to the three-phase AC power grid 103. However, the MMC 102 could include any number of phase legs corresponding to phases of a multi-phase AC power grid 103.

Each phase leg of the MMC 102 can include an upper arm and a lower arm. Each arm can include an arrangement of one or more switching power cells 106, which can be controlled using an HCM-SCC paradigm. Each switching power cell 106 can include a switching mechanism S that can include one or more switches. The concepts discussed can be applied to different topologies of switching power cells, such as those having full bridge, semi full bridge, and half bridge arrangements of switching transistors, among others. Further, the concepts can be applied to various combinations of different arrangements of switching transistors in switching power cells. Switching power cell topologies can include any suitable type of semiconductor (or other) power switch devices, such as power bipolar transistors, power metal oxide semiconductor field effect transistors (MOSFETs), or power insulated gate bipolar transistors (IGBTs), among others, for switching power.

In the example shown, the upper arm of phase leg A can include at least one switching power cell 106a and an upper arm inductor $L_{UA}$. Because the switching power cell 106a is in an upper arm, its switch can be referred to as an upper switch $S_{UA}$. The switching power cell 106a can also include a capacitor. The switching power cell 106a can be connected in series with the upper arm inductor $L_{UA}$. The upper switch $S_{UA}$ can switch between (1) a position that causes the capacitor of the switching power cell 106a to be connected in series with the upper arm inductor $L_{UA}$, and (2) a position that causes the capacitor of the switching power cell 106a to be shorted, or shorted in series with the upper arm inductor $L_{UA}$. The arm current $i_{UA}$ can be a current through the upper arm. The lower arm can include one or more switching power cells 106b and a lower arm inductor $L_{LA}$. The switching power cell 106b can include a lower switch $S_{LA}$ and a capacitor. The arm current $i_{LA}$ can be a current through the lower arm. Each arm of phase leg A can connect to an output inductor $L_{oA}$.

The upper arm of phase leg B can include at least one switching power cell 106c and an upper arm inductor $L_{UB}$. The switching power cell 106c can include a capacitor and an upper switch $S_{UB}$. The arm current $i_{UB}$ can be a current through the upper arm. The lower arm can include one or more switching power cells 106d and a lower arm inductor $L_{LB}$. The switching power cell 106d can include a capacitor and a lower switch $S_{LB}$. The arm current $i_{LB}$ can be a current through the lower arm. Each arm of phase leg B can connect to an output inductor LOB.

The upper arm of phase leg C can include at least one switching power cell 106e and an upper arm inductor $L_{UC}$. The switching power cell 106e can include a capacitor and an upper switch $S_{UC}$. The arm current $i_{UC}$ can be a current through the upper arm of the phase leg. The lower arm of the phase leg can include one or more switching power cells 106f and a lower arm inductor $L_{LC}$. The switching power cell 106f can include a capacitor and a lower switch $S_{LC}$. The arm current $i_{LC}$ can be a current through the lower arm. Each arm of phase leg C can connect to an output inductor $L_{oC}$.

The switches of the switching power cells 106 can be controlled using the HCM-SCC control method as described further below. In some cases, each of the switching power cells 106 includes its own controller or HCM-SCC device. In other situations, all or multiple ones of the switching power cells 106 can be controlled by a single controller or HCM-SCC device. The controller or HCM-SCC device can include one or more discrete logic circuits, microprocessors, microcontrollers, or digital signal processors (DSPs), application specific integrated circuits (ASICs), programmable logic devices (e.g., field-programmable gate array (FPGAs), or complex programmable logic devices (CPLDs), among other types of processing circuitry.

The MMC 102 can, for example, convert high DC voltage from the DC power system 101 into high AC voltage for the power system 103 without a transformer. FIG. 1 illustrates a representative example of the way an MMC 102 can be used to convert power between two different power grids or systems. In other cases, the MMC 102 can convert power between two different AC power systems 103, two different DC power systems 101, or other AC and DC power systems.

The amount of capacitor voltage ripple in the switching power cells of the MMC 102 is a relatively important factor when designing and evaluating a power converter system for high voltage, high power applications. High voltage consumer, scientific, medical, military, and industrial applications such as air filtration, imaging, and testing systems often require stable, low ripple and well-regulated output voltages. The amount of capacitor voltage ripple is additionally important when a DC grid is interconnected with an AC grid using a transformerless AC-DC interface converter, for example, for transmission over a high-voltage AC network or grid after conversion from a high-voltage DC transmission system.

Figure 2:
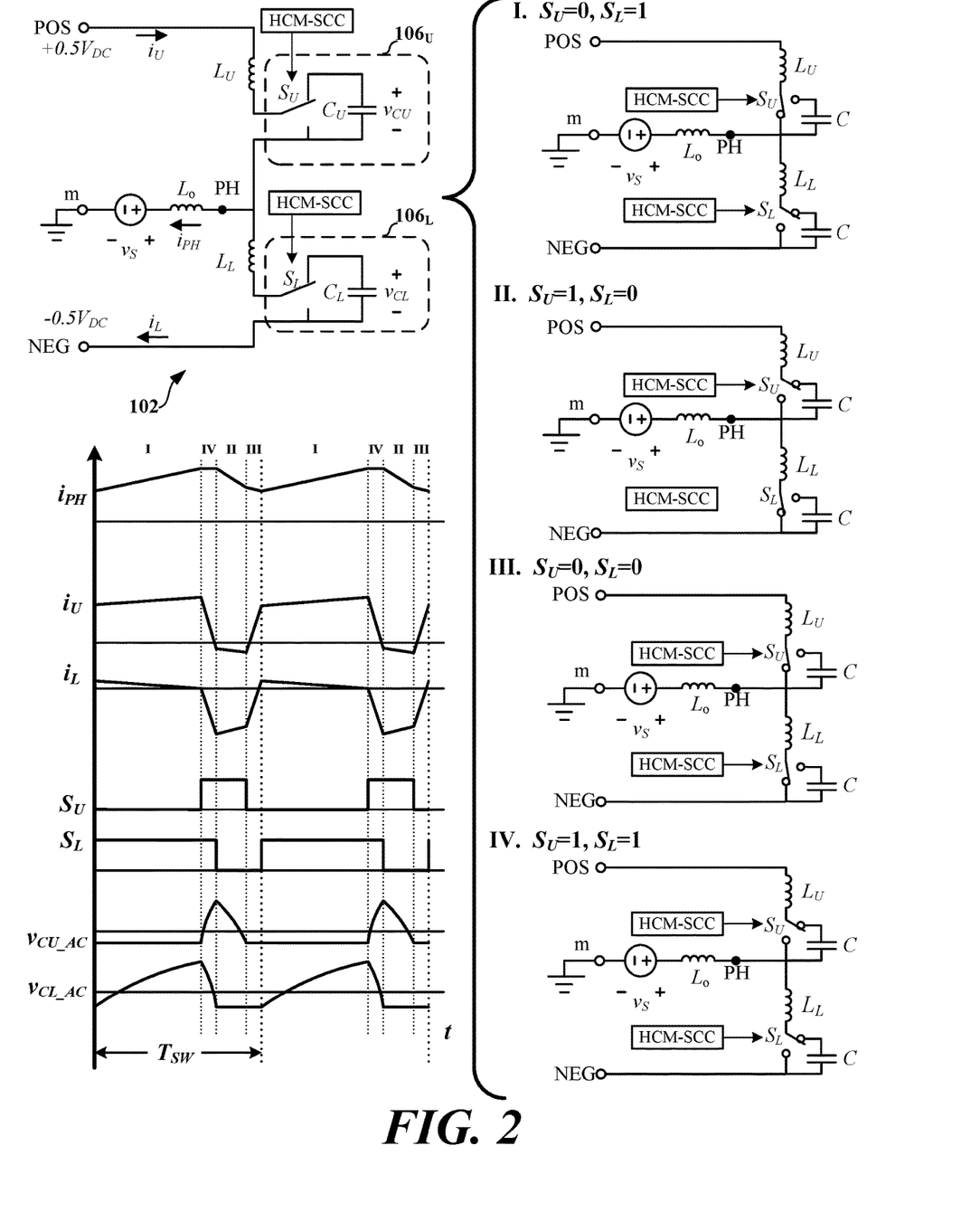
FIG. 2 illustrates an example phase leg of the MMC of FIG. 1, and the operation of various switch states for the phase leg, according to various examples described herein.

FIG. 2 illustrates an example MMC 102 for use in an HCM-SCC power converter system similar to that shown in FIG. 1. An upper arm of the phase leg of the MMC 102 can include a switching power cell $106_U$ and an upper arm inductor $L_U$. The switching power cell $106_U$ can include an upper capacitor $C_U$ and an upper switch $S_U$. Voltage across the capacitor $C_U$ can be $v_{CU}$. The arm current $i_U$ can be a current through the upper arm. The lower arm of the phase leg can include a switching power cell $106_L$ and a lower arm inductor $L_L$. The switching power cell $106_L$ can include a lower capacitor $C_L$ and a lower switch $S_L$. Voltage across the capacitor $C_L$ can be $v_{CL}$. The arm current $i_L$ can be a current through the lower arm. Each arm of the phase leg can connect to an output inductor $L_o$.

The MMC 102 can be switched into a number of states. State I can refer to the state where $S_U$ shorts the upper capacitor $C_U$ or the upper switching power cell $106_U$, while $S_L$ connects the lower capacitor $C_L$ or the lower switching power cell $106_L$ in series. State II can refer to the state where $S_U$ connects the upper capacitor $C_U$ or the upper switching power cell $106_U$ in series, while $S_L$ shorts the lower capacitor $C_L$ or the lower switching power cell 106. State III can refer to the state where $S_U$ shorts the upper capacitor $C_U$ or the upper switching power cell $106_U$, while $S_L$ shorts the lower capacitor $C_L$ or the lower switching power cell 106. State IV can refer to the state where $S_U$ connects the upper capacitor $C_U$ or the upper switching power cell $106_U$ in series, while $S_L$ connects the lower capacitor $C_L$ or the lower switching power cell $106_L$ in series. States I and II are normal operation states and States III and IV are the "shoot-through" states, as can be understood in the waveforms shown.

The shoot through states can be caused by a delay between switching the upper and lower switch controls for $S_U$ and $S_L$. For example, rather than $S_L$ being disabled (shorting the capacitor) immediately once $S_U$ is enabled (connecting the capacitor in series), there is a delay for a period of time where both $S_U$ and $S_L$ are enabled, resulting in State IV. Likewise, rather than $S_L$ being enabled immediately once $S_U$ is disabled, there is a delay for a period of time where both $S_U$ and $S_L$ are disabled, resulting in State III. This delay between the upper and lower switch controls can be implemented using one or more HCM-SCC controllers to control the switches of the MMC 102.

Figure 3:
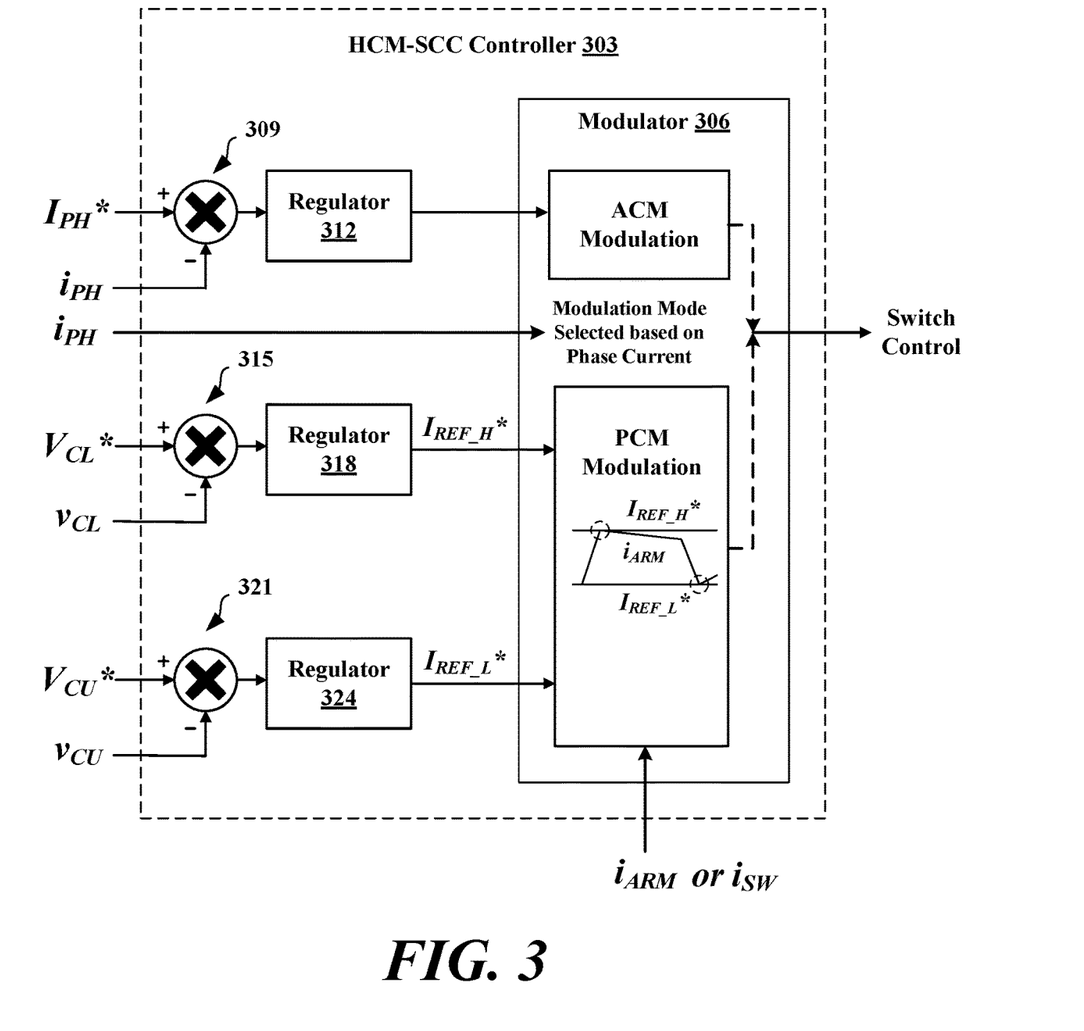
FIG. 3 illustrates an example controller for hybrid-current-mode switching-cycle control of the MMC of FIG. 1, according to various examples described herein.

FIG. 3 shows an example of an HCM-SCC controller 303 that can implement HCM-SCC for one or more of the switches of the MMC 102. The HCM-SCC controller 303 can take a number of inputs and output switch controls that operate one or more of the switches of the MMC 102 according to an HCM-SCC method or control paradigm. For example, the HCM-SCC controller 303 can have inputs including a reference phase current $I_{PH}^*$, a detected or measured phase current $i_{PH}$, a reference lower capacitor voltage $V_{CL}^*$, a detected lower capacitor voltage $v_{CL}$, a reference upper capacitor voltage $V_{CU}^*$, a detected upper capacitor voltage $v_{CU}$, and a detected arm current $i_{ARM}$. The measured voltages and currents can be measured using corresponding voltage sensors and current sensors. The HCM-SCC controller 303 can, based on these inputs, produce switch controls for a particular switch according to a selected modulation mode. HCM-SCC controller 303 can select the modulation mode for the particular switch between average current mode (ACM) modulation and peak current mode (PCM) modulation based on the polarity of the phase current $i_{PH}$, and an arm designation of the switch corresponding to an upper arm or a lower arm of a phase leg.

In some examples, upper switches can have an opposite modulation mode from the lower switches, such that ACM modulation is utilized for upper switching power cells 106 while PCM modulation is utilized for lower switching power cells 106, and PCM modulation is utilized for upper switching power cells 106 while ACM modulation is utilized for lower switching power cells 106. In other words, HCM-SCC controller 303 can select the modulation mode for a power cell 106 in an (upper/lower) arm of a phase leg between ACM modulation and PCM modulation, such that it is different than the modulation mode selected for the other arm, which is also selected between ACM modulation and PCM modulation. To this end, the modulator 306 of the HCM-SCC controller 303 can be set to utilize ACM modulation or PCM modulation for a switch while the phase current corresponds to a particular polarity and can be changed to utilize the other modulation mode if the phase current polarity changes.

In order to perform ACM modulation, the reference phase current $I_{PH}^*$ and the phase current $i_{PH}$ can be differenced or compared in a differencing component 309 of the HCM-SCC controller 303, in order to determine a phase current error. The phase current error can be provided to a regulator 312, and the result can be input into a modulator 306. The modulator 306 can perform ACM modulation using this phase-current-error-based input.

In order to perform PCM modulation, the lower capacitor voltage reference $V_{CL}^*$ and the lower capacitor voltage $v_{CL}$ can be differenced or compared in a differencing component 315 of the HCM-SCC controller 303, in order to determine a lower capacitor voltage error. The lower capacitor voltage error can be provided to a regulator 318 to determine a high (or low) arm current boundary $I_{REF\_H}^*$. Likewise, the upper capacitor voltage reference $V_{CU}^*$ and the upper capacitor voltage $v_{CU}$ can be differenced or compared in a differencing component 321 of the HCM-SCC controller 303, in order to determine an upper capacitor voltage error. The upper capacitor voltage error can be provided to a regulator 324 to determine a low (or high) arm current boundary $I_{REF\_L}^*$. The modulator 306 can generate switch control signals for a switching power cell 106 based on the arm current boundary crossings. This is described in further detail with respect to FIG. 4.

While the arm current boundary crossings can be identified by sensors that monitor the arm current $I_{ARM}$ directly, this can be difficult to achieve based on the amplitude and generally high rate of change of the arm current $I_{ARM}$. A sensor that monitors the arm current $I_{ARM}$ directly may be unavailable, prohibitively expensive, or otherwise problematic to implement. However, these arm current boundary crossings can be identified indirectly by sensors that detect switch currents. As a result, the high current boundary $I_{REF\_H}^*$ and low current boundary $I_{REF\_L}^*$ can be compared to one or more switch currents of a particular switching power cell 106 to identify arm current boundary crossings. This is described in further detail with respect to FIG. 5.

Figure 4:
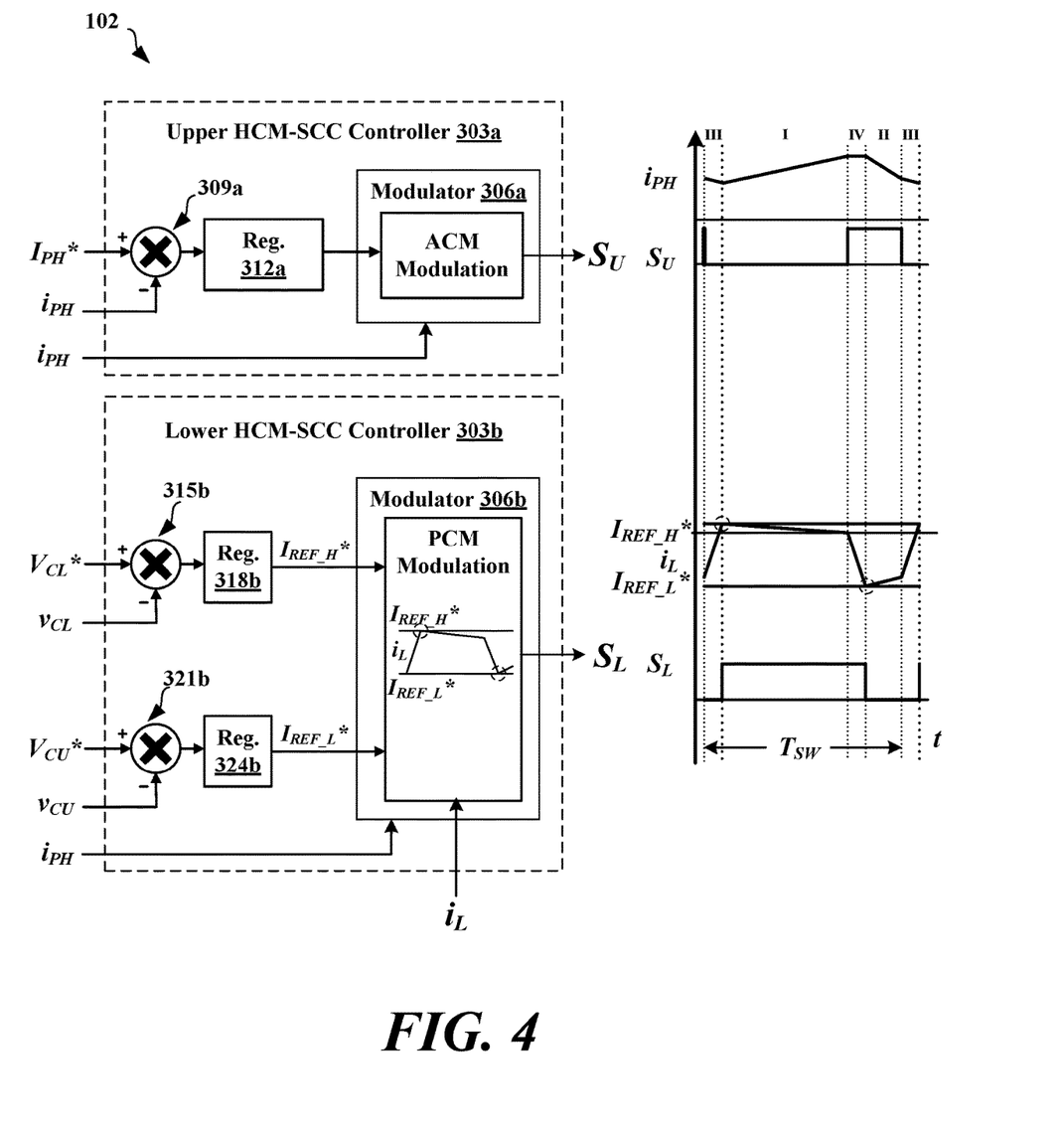
FIG. 4 illustrates an example of the operation of a phase leg of the MMC of FIG. 1, including an upper controller and a lower controller utilizing arm current for peak current control modulation, according to various examples described herein.

FIG. 4 shows an example of the operation of a phase leg of an MMC 102, including an upper HCM-SCC controller 303a and a lower HCM-SCC controller 303b. While the upper HCM-SCC controller 303a and the lower HCM-SCC controller 303b are referred to as separate components they can be implemented using the same (e.g., combined) control or processing circuitry that provides the functionality discussed for upper and lower arms, or can be implemented using different (e.g., separated) circuitry.

The upper HCM-SCC controller 303a can use phase current error for ACM modulation. The upper HCM-SCC controller 303a can generate switch control signals for an upper switch based on the phase current error and ACM modulation mode. The phase current polarity can be positive, and the modulation mode for the modulator 306a of the upper HCM-SCC controller 303a that controls an upper switching power cell 106 can be set to ACM modulation, while the modulation mode for the modulator 306b of the lower HCM-SCC controller 303b that controls a lower switching power cell 106 can be set to PCM modulation. The reference phase current $I_{PH}^*$ and the phase current $i_{PH}$ can be differenced or compared in a differencing component 309a of the upper HCM-SCC controller 303a, in order to determine a phase current error. The phase current error can be provided to a regulator 312a, and the result can be input into a modulator 306a. The modulator 306a can perform ACM modulation to generate control signals for an upper switching power cell 106 using this phase-current-error-based input.

As indicated above, the modulation mode for the modulator 306b of the lower HCM-SCC controller 303b can be set to PCM modulation. The lower capacitor voltage reference $V_{CL}^*$ and the lower capacitor voltage $v_{CL}$ can be differenced or compared in a differencing component 315b of the lower HCM-SCC controller 303b, in order to determine a lower capacitor voltage error. The lower capacitor voltage error can be provided to a regulator 318b to determine a high current boundary $I_{REF\_H}^*$. The upper capacitor voltage reference $V_{CU}^*$ and the upper capacitor voltage $v_{CU}$ can be differenced or compared in a differencing component 321b of the lower HCM-SCC controller 303b, in order to determine an upper capacitor voltage error. The upper capacitor voltage error can be provided to a regulator 324b to determine a low current boundary $I_{REF\_L}^*$. The high current boundary $I_{REF\_H}^*$ and low current boundary $I_{REF\_L}^*$ can be compared to the lower arm current $i_L$ to identify arm current boundary crossings where the lower arm current crosses or touches one of the current boundaries or arm current boundaries.

The difference between the ACM modulation of the control signal for the upper switch $S_U$ and PCM modulation of the control signal for the lower switch $S_L$ can cause a delay of the PCM-modulated control signal. This delay between switching the upper and lower switch controls for $S_U$ and $S_L$ can cause shoot-through states III and IV. For example, rather than $S_L$ being enabled immediately once $S_U$ is disabled, there is a delay for a period of time where both $S_U$ and $S_L$ are disabled, resulting in State III. Rather than $S_L$ being disabled immediately once $S_U$ is enabled, there is a delay for a period of time where both $S_U$ and $S_L$ are enabled, resulting in State IV.

Figure 5:
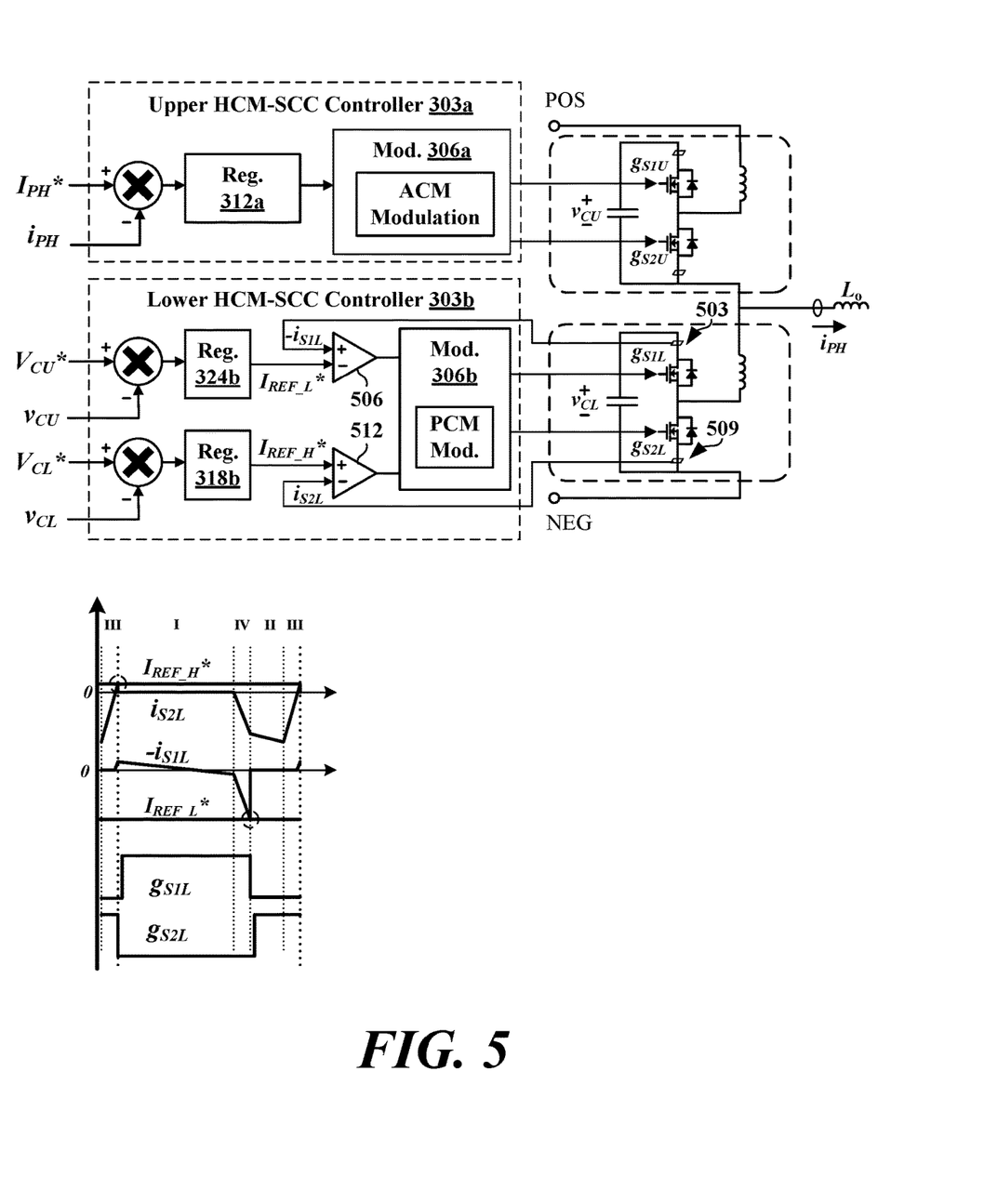
FIG. 5 illustrates an example of the operation of a phase leg of the MMC of FIG. 1, including an upper controller and a lower controller utilizing switch currents for peak current control modulation, according to various examples described herein.

FIG. 5 shows an example of the operation of a phase leg of an MMC 102, including an upper HCM-SCC controller 303a and a lower HCM-SCC controller 303b. FIG. 5 differs from FIG. 4 by providing an example where arm current boundaries are identified indirectly, or based on switch currents rather than arm current.

The upper HCM-SCC controller 303a can generate switch control signals for an upper switch based on the phase current error and ACM modulation mode. The phase current polarity can be positive, and the modulation mode for the upper HCM-SCC controller 303a that controls an upper switching power cell 106 can be set to ACM modulation, while the modulation mode for the lower HCM-SCC controller 303b that controls a lower switching power cell 106 can be set to PCM modulation. The reference phase current $I_{PH}^*$ and the phase current $i_{PH}$ can be differenced or compared in a differencing component 309a of the upper HCM-SCC controller 303a, in order to determine a phase current error. The phase current error can be provided to a regulator 312a, and the result can be input into a modulator 306a. The modulator 306a can perform ACM modulation to generate control signals for an upper switching power cell 106 using this phase-current-error-based input.

The ACM switch control signals generated by the upper HCM-SCC controller 303a can include signals for switches $g_{S1U}$ and $g_{S2U}$, which implement switching for the upper switching power cell. For example, when the upper switching power cell is to be set to short the capacitor, the control signal for $g_{S1U}$ can change from high to low, and after a short time or deadband, $g_{S2U}$ can change from low to high. When the upper switching power cell is to be set to connect the capacitor in series, the control signal for $g_{S2U}$ can change from high to low, and after a short time or deadband, $g_{S1U}$ can change from low to high.

The modulation mode for the lower HCM-SCC controller 303b can be set to PCM modulation. The upper capacitor voltage reference $V_{CU}^*$ and the upper capacitor voltage $v_{CU}$ can be differenced or compared in a differencing component of the lower HCM-SCC controller 303b, in order to determine an upper capacitor voltage error. The upper capacitor voltage error can be provided to a regulator 324b to determine a low arm current boundary $I_{REF\_L}^*$. The lower capacitor voltage reference $V_{CL}^*$ and the lower capacitor voltage $v_{CL}$ can be differenced or compared in a differencing component of the lower HCM-SCC controller 303b, in order to determine a lower capacitor voltage error. The lower capacitor voltage error can be provided to a regulator 318b to determine a high arm current boundary $I_{REF\_H}^*$.

A switch current sensor 503 for $g_{S1L}$ can detect switch current $i_{S1L}$. The switch current $-i_{S1L}$ can be compared to $I_{REF\_L}^*$, for example, by comparator 506. The result can be provided to the modulator 306b to generate control signals for the lower switching power cell. For example, this can identify low arm current boundary crossings, because the switch current $-i_{S1L}$ can touch or cross $I_{REF\_L}^*$ when the lower arm current would have a low arm current boundary crossing. In other words, the lower HCM-SCC controller 303b can use the switch current $i_{S1L}$ to indirectly identify low arm current boundary crossings and generate switch control signals.

A switch current sensor 509 for $g_{S2L}$ can detect switch current $i_{S2L}$. The switch current $i_{S2L}$ can be compared to $I_{REF\_H}^*$, for example, by comparator 512. The result can be provided to the modulator 306b to generate control signals for the lower switching power cell. For example, this can identify high arm current boundary crossings, because the switch current $i_{S2L}$ can touch or cross $I_{REF\_H}^*$ when the lower arm current would have a high arm current boundary crossing. In other words, the lower HCM-SCC controller 303b can use the switch current $i_{S2L}$ to indirectly identify high arm current boundary crossings and generate switch control signals.

The PCM switch control signals generated by the lower HCM-SCC controller 303b can include signals for switches $g_{S1L}$ and $g_{S2L}$, which implement switching for the lower switching power cell. For example, when the lower switching power cell is to be set to connect the capacitor in series, the control signal for $g_{S2L}$ can change from high to low, and after a short time or deadband, $g_{S1L}$ can change from low to high. When the lower switching power cell is to be set to short the capacitor, the control signal for $g_{S1L}$ can change from high to low, and after a short time or deadband, $g_{S2L}$ can change from low to high.

Since the upper HCM-SCC controller 303a can also be set to PCM mode, corresponding switch current sensors can also detect switch currents for $g_{S1U}$ and $g_{S2U}$. For example, if the phase current is negative, the upper HCM-SCC controller 303a can be set to PCM modulation, and the lower HCM-SCC controller 303b can be set to ACM modulation.

Figure 6:
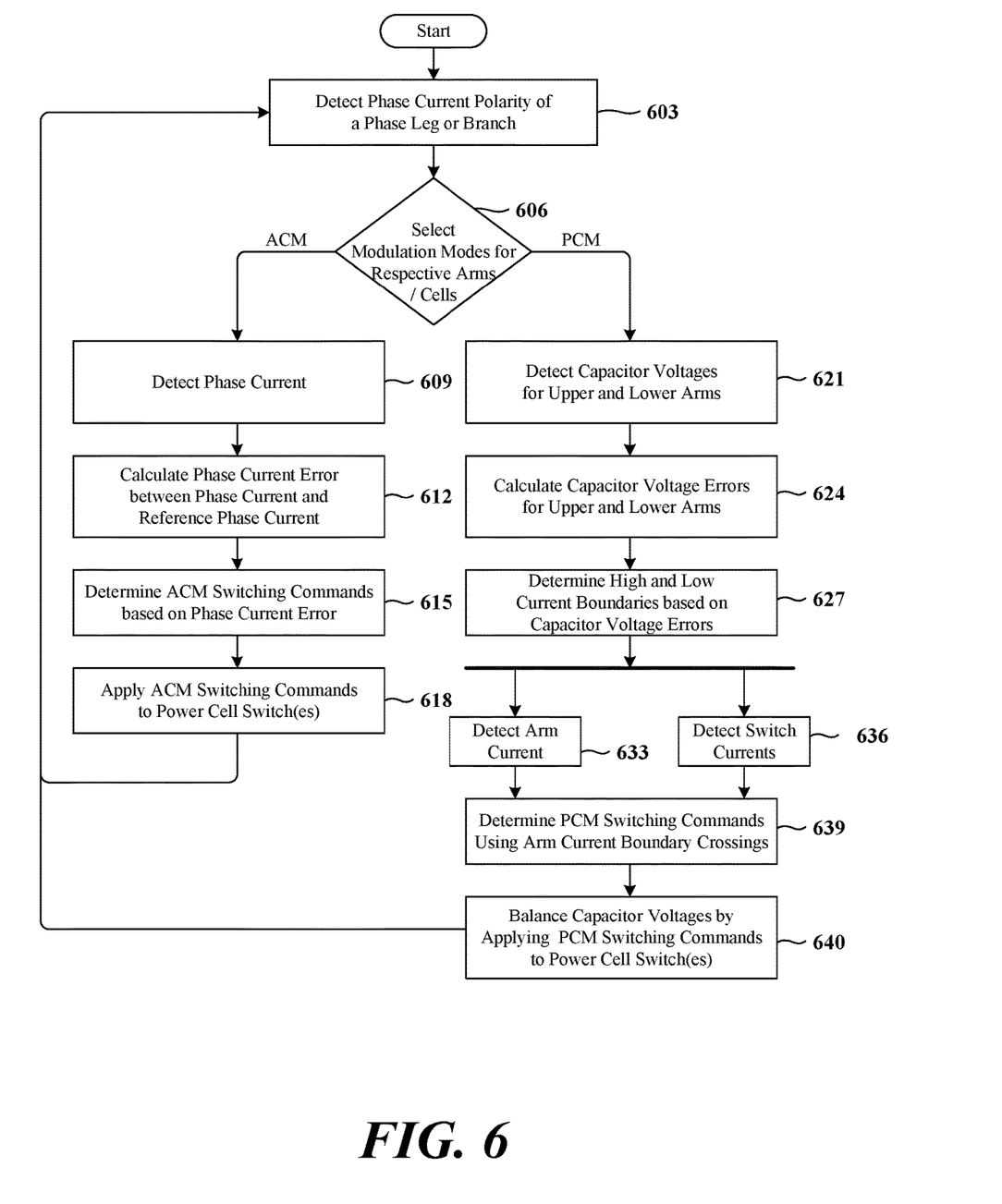
FIG. 6 illustrates an example flowchart describing a method of hybrid-current-mode switching-cycle control, according to various examples described herein.

FIG. 6 illustrates an example flowchart describing a method of hybrid-current-mode switching-cycle control. While the method is described below with respect to the MMC 102 as one example, the method can be performed by other types of power converters as can be understood. Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

In box 603, the MMC 102 can detect phase current polarity of a phase leg. The phase leg can be a phase leg of the MMC 102 corresponding to a phase of an AC power grid 103 to which the MMC 102 is connected, for example, as shown in FIG. 1.

In box 606, the MMC 102 can select modulation modes for respective arms (or switching power cells) of the phase leg. The MMC 102 can select modulation modes between ACM modulation and PCM modulation based on the phase current polarity of the phase leg. For example, an upper arm of the phase leg can be set to ACM modulation while a lower arm of the phase leg is set to PCM modulation. In other situations, a lower arm of the phase leg can be set to ACM modulation while an upper arm of the phase leg is set to PCM modulation.

For ACM modulation, in box 609, the MMC 102 can detect a phase current $i_{PH}$ of the phase leg for ACM modulation. The phase current $i_{PH}$ can be detected using an appropriate current sensor. In box 612, the MMC 102 can calculate a phase current error between the phase current $i_{PH}$ and a phase current reference $I_{PH}{}^*$. For example, the detected phase current $i_{PH}$ and a phase current reference $I_{PH^*}$ can be differenced. The phase current error can be the resulting difference between the detected phase current $i_{PH}$ and phase current reference $I_{PH}{}^*$. The phase current error can be input to a regulator, and the output can be provided to a modulator 306 (see FIG. 3) that is set to ACM modulation.

In box 615, the MMC 102 can determine ACM switching commands based on the phase current error. The ACM switching commands can include control signals for one or more switch for the switching power cell 106. The modulator 306 can receive the phase current error or the phase-current-error-based regulator output and can generate and output the ACM switching commands.

In box 618, the MMC 102 can apply the ACM switching commands to the switch or switches of the switching power cell 106. For example, a switching control signal from the modulator 306 can be provided to a switch of the switching power cell 106. Where the switching power cell 106 includes multiple switches, each of the switches can be controlled in order to achieve the desired states to achieve HCM-SCC control.

For PCM modulation, in box 621, the MMC 102 can detect capacitor voltages for both upper and lower arms of the phase leg. The MMC 102 can use voltage sensors to identify the capacitor voltages. In box 624, the MMC 102 can calculate capacitor voltage errors for upper and lower arms of the phase leg. For example, the MMC 102 can determine an upper capacitor voltage error based on a difference between an upper capacitor voltage and a reference upper capacitor voltage. The MMC 102 can determine a lower capacitor voltage error based on a difference between a lower capacitor voltage and a reference lower capacitor voltage.

In box 627, the MMC 102 can use the capacitor voltage errors to generate high and low current boundaries. For example, the upper capacitor voltage error can be input into a regulator to generate the low current boundary (or the high current boundary). The lower capacitor voltage error can be input into a regulator to generate the high current boundary (or the low current boundary). The MMC 102 can compare the current boundaries to an arm current or switch currents.

In box 633, the MMC 102 detects arm current. This can allow the MMC 102 to identify arm current boundary crossings directly. For example, a sensor can detect arm current, and compare the arm current to the reference currents to identify when the arm current touches one of the reference currents. The magnitude and rate of change of the arm current can make this difficult or expensive to achieve. Nevertheless, this process can be used to directly identify arm current boundary crossings.

In box 636, the MMC 102 detects switch currents. For example, a switching power cell 106 can include two switches. The current through one switch can be detected using a sensor and compared to the high current boundary. The current through the second switch can be detected using another sensor and can be compared to the low current boundary. This process can be used to indirectly identify arm current boundary crossings and can be achieved using simpler or more economical sensors as compared to direct arm current detection.

In box 639, the MMC 102 can determine PCM switching commands based on arm current boundary crossings as described in box 633 and/or box 636. A modulator 306 of the MMC 102 can be set to PCM mode. The modulator 306 can, generate control signals for one or more switches of a switching power cell 106 based on the current boundary crossings.

In box 640, the MMC 102 can balance capacitor voltages by applying PCM switching commands to the switch or switches of the switching power cell 106. As described herein, the PCM modulated control signals, when used in conjunction with ACM modulated control signals in another arm of the phase leg, can cause shoot through states III and IV by providing a delay between switching the upper and lower switch controls.

The components described herein, including the controllers, modulators, and other components, can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. While figures are provided for clarity of discussion, it is understood that the concepts described with respect to a particular figure can be utilized and combined with the concepts described with respect to the other figures. Many variations and modifications can be made without departing substantially from the spirit and principles of the disclosure. All such modifications and variations are intended to be included herein within the scope of this disclosure and protected by the following claims.

Therefore, the following is claimed:
1. A power converter system, comprising:
a direct current (DC) power system;
an alternating current (AC) power system; and
a modular multilevel converter configured for hybrid-current-mode switching-cycle control, the modular multilevel converter comprising:

a phase leg comprising an upper arm comprising an upper switching power cell, and a lower arm comprising a lower switching power cell;

an upper controller that generates a first switch control signal for switching the upper switching power cell according to a first modulation mode selected between average current mode and peak current mode; and a lower controller that generates a second switch control signal for switching the lower switching power cell according to a second modulation mode selected between the average current mode and the peak current mode, wherein the second modulation mode is different from the first modulation mode.

2. The power converter system of claim 1, wherein the peak current mode modulates based on a high boundary reference current and a low boundary reference current.

3. The power converter system of claim 2, wherein the high boundary reference current or the low boundary reference current is generated based on an upper capacitor voltage error between an upper capacitor reference voltage and an upper capacitor voltage of the upper switching power cell.

4. The power converter system of claim 2, wherein the peak current mode modulates based on at least one arm current boundary crossing identified by comparing an arm current to the high boundary reference current and the low boundary reference current.

5. The power converter system of claim 2, wherein the peak current mode modulates based on at least one arm current boundary crossing identified by comparing a switch current to the high boundary reference current or the low boundary reference current.

6. The power converter system of claim 1, wherein the first modulation mode and the second modulation mode are selected based on a phase current polarity of the phase leg.

7. The power converter system of claim 6, wherein, when the phase current polarity is positive, the first modulation mode is the average current mode, and the second modulation mode is the peak current mode.

8. A method for switching-cycle control of a modular multilevel converter, the method comprising:

selecting, by a controller device, a peak current mode to control a switching power cell of an arm of a phase leg of the modular multilevel converter, the phase leg comprising an upper arm and a lower arm, the switching power cell comprising a capacitor and at least one switch;

generating, by the controller device, at least one switch control signal that switches the switching power cell according to the peak current mode based on at least one arm current boundary crossing identified for the arm; and generating another at least one switch control signal that switches another switching power cell of another arm of the phase leg according to an average current mode.

9. The method of claim 8, further comprising:

generating, by the controller device, a boundary reference current based on a capacitor voltage error between a capacitor voltage and at least one capacitor voltage reference, wherein an arm current boundary crossing is identified based on the boundary reference current.

10. The method of claim 8, wherein the at least one arm current boundary crossing is identified based on a comparison between an arm current and a boundary reference current.

11. The method of claim 8, further comprising:

detecting a switch current of the switching power cell, wherein an arm current boundary crossing is identified based on a comparison between the switch current and a boundary reference current.

12. The method of claim 8, wherein the at least one switch control signal comprises a control signal that switches from high to low, or from low to high, in response to an arm current boundary crossing.

13. The method of claim 8, wherein a modulation mode is selected between the peak current mode and the average current mode based on a phase current polarity of the phase leg.

14. The method of claim 8, wherein the least one arm current boundary crossing identified for the arm is identified using an arm current for the arm, or a switch current for the at least one switch.

15. A modular multilevel converter, comprising:

a phase leg comprising an upper arm and a lower arm, a respective arm comprising an arm inductor and at least one switching power cell, a respective switching power cell comprising a capacitor and at least one switch; and a controller that generates at least one switch control signal that switches a particular switching power cell of a particular arm of the phase leg according to a peak current mode based on at least one arm current boundary crossing identified for the particular arm, wherein a modulation mode is selected between the peak current mode and an average current mode based on a phase current polarity of the phase leg.

16. The modular multilevel converter of claim 15, wherein the controller generates a boundary reference current based on a capacitor voltage error between a capacitor voltage and at least one capacitor voltage reference, wherein a particular arm current boundary crossing of the at least one arm current boundary crossing is identified based on the boundary reference current.

17. The modular multilevel converter of claim 15, wherein the at least one arm current boundary crossing is identified based on a comparison between an arm current and at least one boundary reference current.

18. The modular multilevel converter of claim 15, further comprising:

a switch current sensor that detects a switch current of a switching power cell, wherein an arm current boundary crossing is identified based on a comparison between the switch current and a boundary reference current.

19. The modular multilevel converter of claim 15, wherein the at least one switch control signal comprises a control signal that switches from high to low, or from low to high, in response to an arm current boundary crossing.

20. The modular multilevel converter of claim 15, wherein the least one arm current boundary crossing identified for the particular arm is identified using a switch current.

* * * * *